United States Patent
Nielsen et al.

[11] Patent Number: 5,845,122
[45] Date of Patent: Dec. 1, 1998

[54] METHOD AND APPARATUS FOR ALLOWING A USER TO SELECT FROM A SET OF MUTUALLY EXCLUSIVE OPTIONS

[75] Inventors: Jakob Nielsen, Atherton; Andrea Mankoski, Mountain View, both of Calif.

[73] Assignee: Sun Microsystems, Inc., Mountain View, Calif.

[21] Appl. No.: 576,471

[22] Filed: Dec. 21, 1995

[51] Int. Cl.$^6$ ........................................... G06F 3/14
[52] U.S. Cl. .................. 395/354; 395/352; 395/339; 395/975; 345/146
[58] Field of Search ........................ 395/354, 352, 395/347, 348, 975, 339, 353, 970, 965; 345/146, 145, 902

[56] References Cited

U.S. PATENT DOCUMENTS

| | | | |
|---|---|---|---|
| 5,179,653 | 1/1993 | Fuller | 395/354 |
| 5,283,560 | 2/1994 | Bartlett | 395/352 X |
| 5,321,420 | 6/1994 | Rezek et al. | 345/146 X |
| 5,363,481 | 11/1994 | Tilt | 395/352 |
| 5,450,539 | 9/1995 | Ruben | 395/354 |
| 5,565,888 | 10/1996 | Selker | 345/146 |

*Primary Examiner*—Raymond J. Bayerl
*Attorney, Agent, or Firm*—Blakely Sokoloff Taylor & Zafman

[57] ABSTRACT

A method and apparatus for allowing a user to select one of a plurality of mutually-exclusive options. A set of visual objects are displayed on the display device of a computer system. Each of the visual objects in the set corresponds to one of the mutually-exclusive options. No more than one of the visual objects is displayed in a selected state. The remainder of the visual objects in the set are displayed in an unselected state. The user selects one of the mutually exclusive options by performing a first action that selects one of the visual objects in the set, and then a second action that selects the option associated with the selected visual object. When the user performs the first action, the selected visual object is displayed in an excited state, and the remainder of the visual objects are displayed in a disappointed state. Thus, the user is provided visual feedback that identifies all of the options that will be affected by the user's selection of the option associated with the selected visual object. In one embodiment, when the user performs the second action, the visual object associated with the selected option is displayed in a selected state, and the remainder of the visual objects in the set are displayed in an unselected state. According to one embodiment, the visual objects are radio buttons, an excited radio button is displayed as a happy face and a disappointed radio button is displayed as a sad face.

30 Claims, 6 Drawing Sheets

METHOD AND APPARATUS FOR ALLOWING A USER TO SELECT FROM A SET OF MUTUALLY EXCLUSIVE OPTIONS

FIELD OF THE INVENTION

The present invention relates to interaction between a user and computer, and more specifically, to a method and apparatus for allowing a user to select one of a plurality of mutually exclusive options.

BACKGROUND OF THE INVENTION

Computer programs often require the user to enter information. To facilitate the entry of information, many computer programs present the user with virtual control panels that display graphical user interface objects. By interacting with the graphical user interface objects, the user conveys information to the computer program. Typically, the user interacts with the graphical user interface objects by operating one or more input devices, such as a keyboard, mouse, trackball, light pen, or touch sensitive screen.

For example, a user may move a mouse to cause a position indicator displayed on the computer screen to move. When the position indicator is positioned over a button that corresponds to an action that the computer program is able to perform, the user pushes a button on the mouse to indicate to the computer program that the user desires the computer to perform the operation associated with the button.

Different types of user interface objects are designed to receive different types of information. For example, textboxes are designed to receive arbitrary text strings, such as file or directory names. Check boxes are designed to indicate whether certain options are selected. Buttons are designed to receive input specifying actions to be performed. Radio buttons allow a user to select one option from a set of mutually exclusive options.

A conventional radio button consists of a graphical user interface object that has two display states: a selected state and an unselected state. An option indicator that indicates to the user the option associated with a radio button is typically displayed adjacent to the radio button. The option indicator may be, for example, a word that describes the option associated with the radio button. When the option associated with a radio button is not selected, the computer displays the radio button in an unselected state. When a user desires to select the option associated with a radio button, the user operates an input device to select the radio button. In response to receiving input that selects a radio button, the computer causes the radio button to be displayed in the selected state.

Because radio buttons are designed to allow a user to select one option from a set of mutually exclusive options, each radio button logically belongs to a specific set of radio buttons (a "radio button set"). Each radio button in a radio button set corresponds to a different option from a set of mutually exclusive options (an "option set"). Because the options in an option set are mutually exclusive, only one option from a given option set may be selected at a time. Therefore, the selection of one option in an option set automatically causes any previously selected option in the same option set to become deselected. Typically, the deselection of an option is conveyed to a user by causing the radio button associated with the previously selected option to be displayed in the unselected state in response to receiving input that selects a different option from the same option set.

One disadvantage of conventional radio buttons is that they tend to confuse and frustrate novice users. Specifically, radio buttons do not inherently communicate the fact that the options associated with a radio button set are mutually exclusive. Therefore, a novice user may attempt to select more than one option from an option set. Because the selection of one option deselects the previously selected option, only the most-recently selected option will remain selected. If the novice user continues to use the computer program without noticing that the radio buttons associated with the previously selected options have returned to an unselected state, then the computer program will not operate consistent with the user's expectations. If the novice user notices that the previously selected options have returned to an unselected state, then the user may think that the computer program is not functioning correctly.

Even when a user is familiar with the operation of radio buttons, the user may become frustrated and confused if more than one radio button set is displayed at any given time. For example, the user interface 10 shown in FIG. 1 includes a plurality of radio buttons 20, 22, 24, 26 and 28. The option indicators associated with radio buttons 20, 22, 24, 26 and 28 are "Title", "Book", "Creation Date", "Print only to file", and "Printer" respectively. Radio buttons 20 and 28 are in a selected state, while radio buttons 22, 24 and 26 are in an unselected state.

Figure 1:
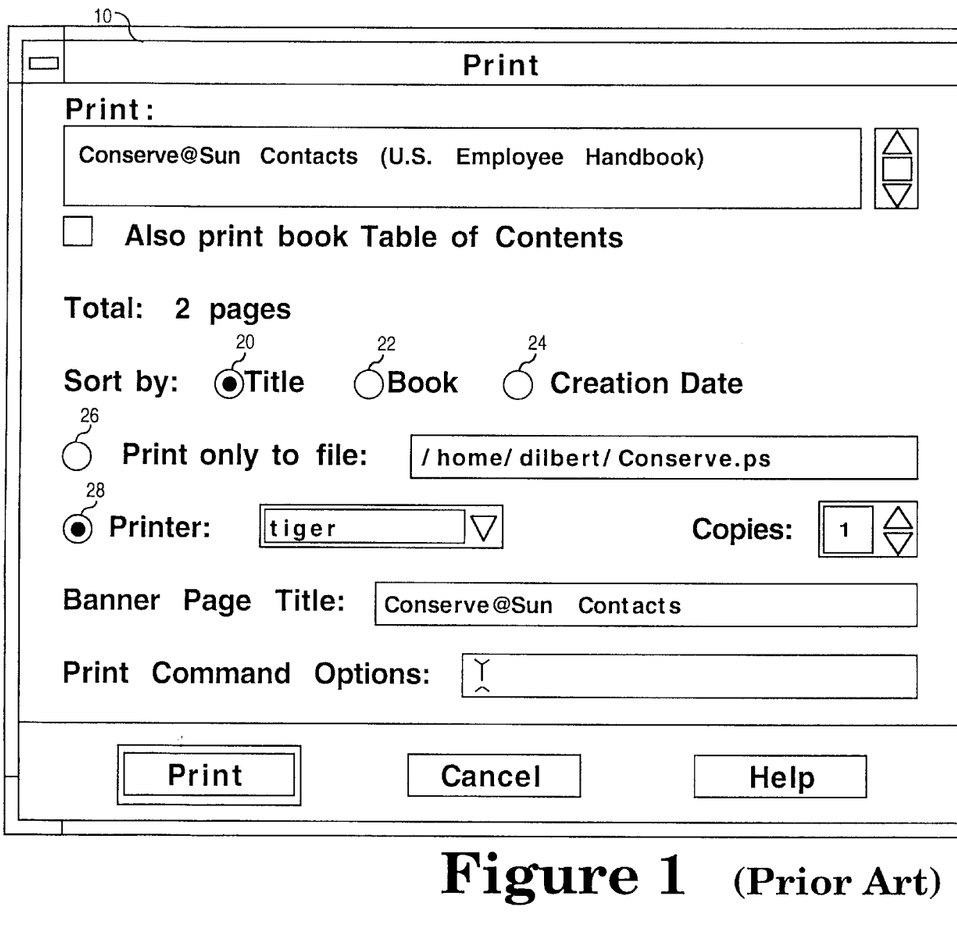
FIG. 1 illustrates a user interface that includes a plurality of graphical user interface objects.

To the experienced computer user, it is immediately obvious that all of radio buttons 20, 22, 24, 26 and 28 cannot be from the same radio button set because more than one of the radio buttons is in a selected state at the same time. Because both radio buttons 20 and 28 are in a selected state, the user can deduce that radio buttons 20 and 28 belong to two different radio button sets. However, it is not immediately apparent to which of the two radio button sets the remaining radio buttons 22, 24 and 26 belong.

Figure 2:
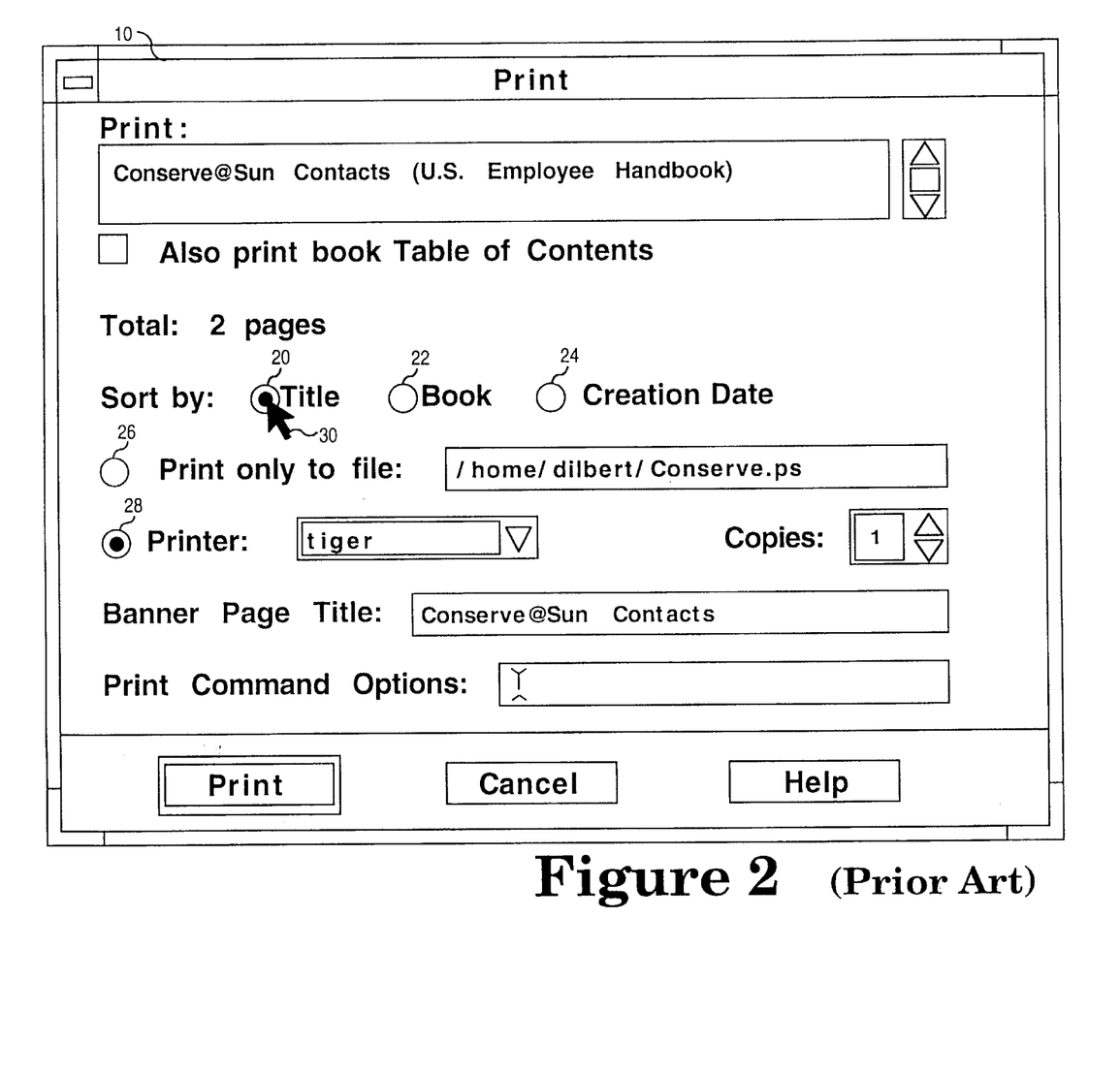
FIG. 2 illustrates the user interface of FIG. 1 including a position indicator positioned over a radio button.

FIG. 2 illustrates user interface 10 during a radio button selection operation. The selection of an option associated with a radio button is a two step process. During the first step, a radio button associated with the option to be selected is selected. During the second step, the option associated with the selected radio button is selected. Each of these two steps is triggered by some action taken by the user. The action a user performs to select a radio button shall be referred to hereafter as the "object-selecting action". The action a user performs to select the option associated with a selected radio button shall be referred to hereafter as the "object-selecting action".

An object-selecting action may be performed, for example, by operating a mouse to move a position indicator over the radio button associated with the desired option, and pressing down on a button of the mouse. In the example illustrated in FIG. 2, the position indicator 30 has been positioned over the radio button 20 associated with the option "Title". Once a user has identified the radio button associated with the desired option, the user performs the object-selecting action to select the option associated with the selected radio button. The option-selecting action may consist of the user releasing the mouse button while the position indicator 30 is still located over the radio button. If the user moves the position indicator 30 away from the selected radio button prior to releasing the mouse button, then the option associated with the selected radio button is not selected.

User interfaces are designed to generate visual feedback to the user at each stage of the option selection process. For example, in the selection operation described above, radio button 20 becomes highlighted when the user pushes down on the mouse button. When the user releases the mouse button, the radio button 20 associated with the selected option is displayed in a selected state, and the radio button associated with any previously-selected option from the same option set is changed from a selected state to an unselected state. In addition, the radio button 20 ceases to be highlighted.

Unfortunately, the visual feedback received by a user during the option selection process does not convey to the user the full scope of the user's action. Specifically, the user is never provided visual feedback that indicates which options are in the option set of an option that the user is about to select. Therefore, the user does not know which options may be affected by the selection of a given option.

Based on the foregoing, it is clearly desirable to provide a method and apparatus for allowing a user to select between mutually exclusive options that is less confusing and ambiguous than conventional radio buttons. It is further desirable to provide visual feedback to the user that better informs the user of the consequences of selecting a particular option.

SUMMARY OF THE INVENTION

A method and apparatus for allowing a user to select one of a plurality of mutually-exclusive options is provided. A set of visual objects are displayed on the display device of a computer system. Each of the visual objects in the set corresponds to one of the mutually-exclusive options. No more than one of the visual objects is displayed in a selected state. The remainder of the visual objects in the set are displayed in an unselected state.

The user selects one of the mutually exclusive options by performing a first action that selects one of the visual objects in the set, and then a second action that selects the option associated with the selected visual object. When the user performs the first action, the computer changes the visual appearance of all of the visual objects in the set without changing the visual appearance of any visual objects that are not in the set. Specifically, the selected visual object is displayed in an excited state, and the remainder of the visual objects are displayed in a disappointed state. Thus, the user is provided visual feedback that identifies all of the options that will be affected by the user's selection of the option associated with the selected visual object.

In one embodiment, the visual appearance of the visual objects in the set is changed again when the user performs the second action. Specifically, the visual object associated with the selected option is displayed in a selected state, and the remainder of the visual objects in the set are displayed in an unselected state. According to one embodiment, the visual objects are radio buttons, an excited radio button is displayed as a happy face and a disappointed radio button is displayed as a sad face.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for allowing a computer user to select between a plurality of options is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 3:
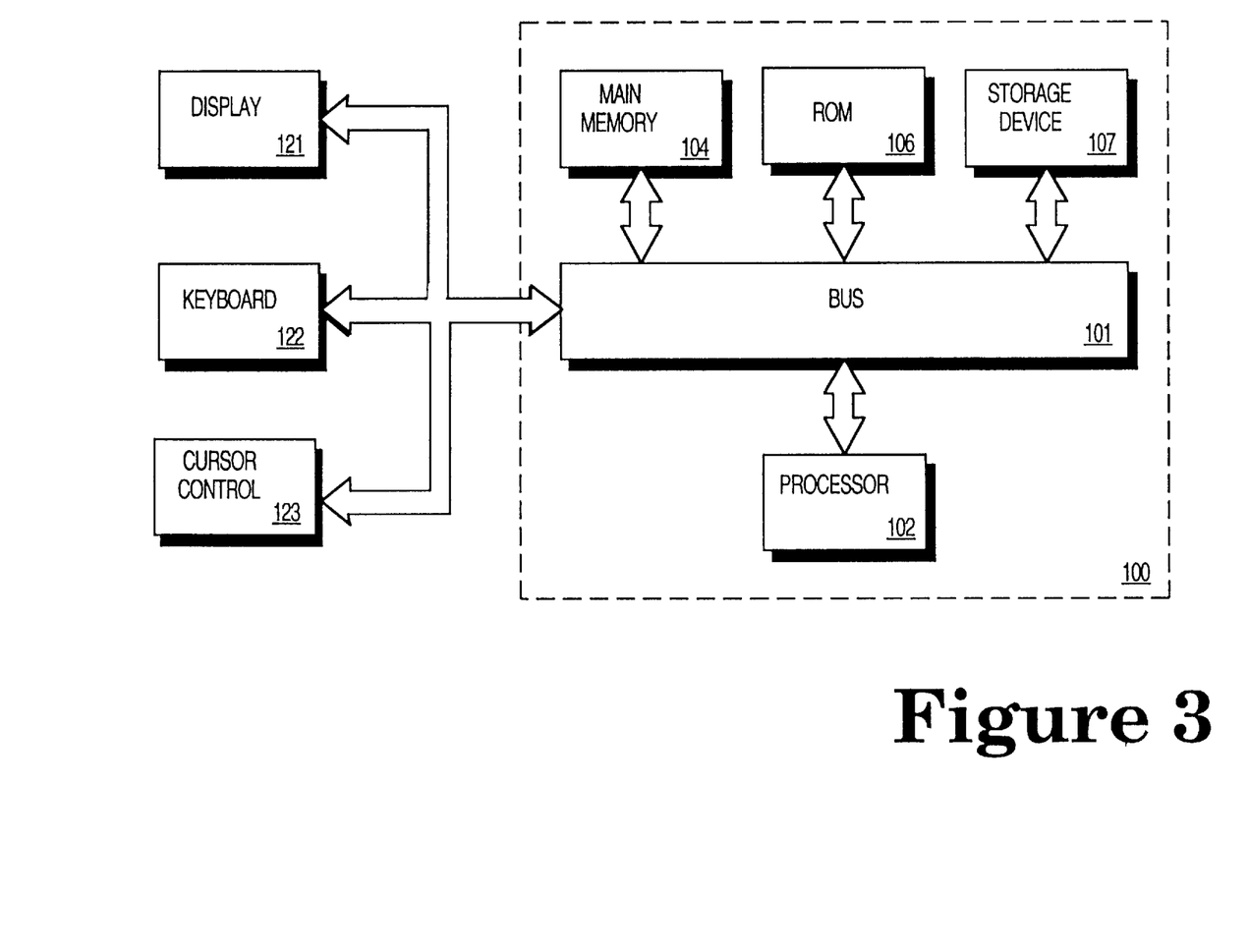
FIG. 3 illustrates a computer system that may be configured to implement the present invention.

Referring to FIG. 3, the computer system upon which the preferred embodiment of the present invention can be implemented is shown as 100. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

The present invention is related to the use of computer system 100 to generate user interface controls that allow a user to select from among a set of mutually exclusive options while providing the user visual feedback about the scope of user's selection options. According to one embodiment, a user interface is generated on display 121 by computer system 100 in response to processor 102 executing sequences of instructions contained in memory 104. The sequences of instructions contained in memory 104 cause processor 102 to generate radio buttons that behave as will be described hereafter. In alternative embodiments, hard-wired circuitry may be used in place of or in combination with software instructions to implement the present invention. Thus, the present invention is not limited to any specific combination of hardware circuitry and software.

Figure 4:
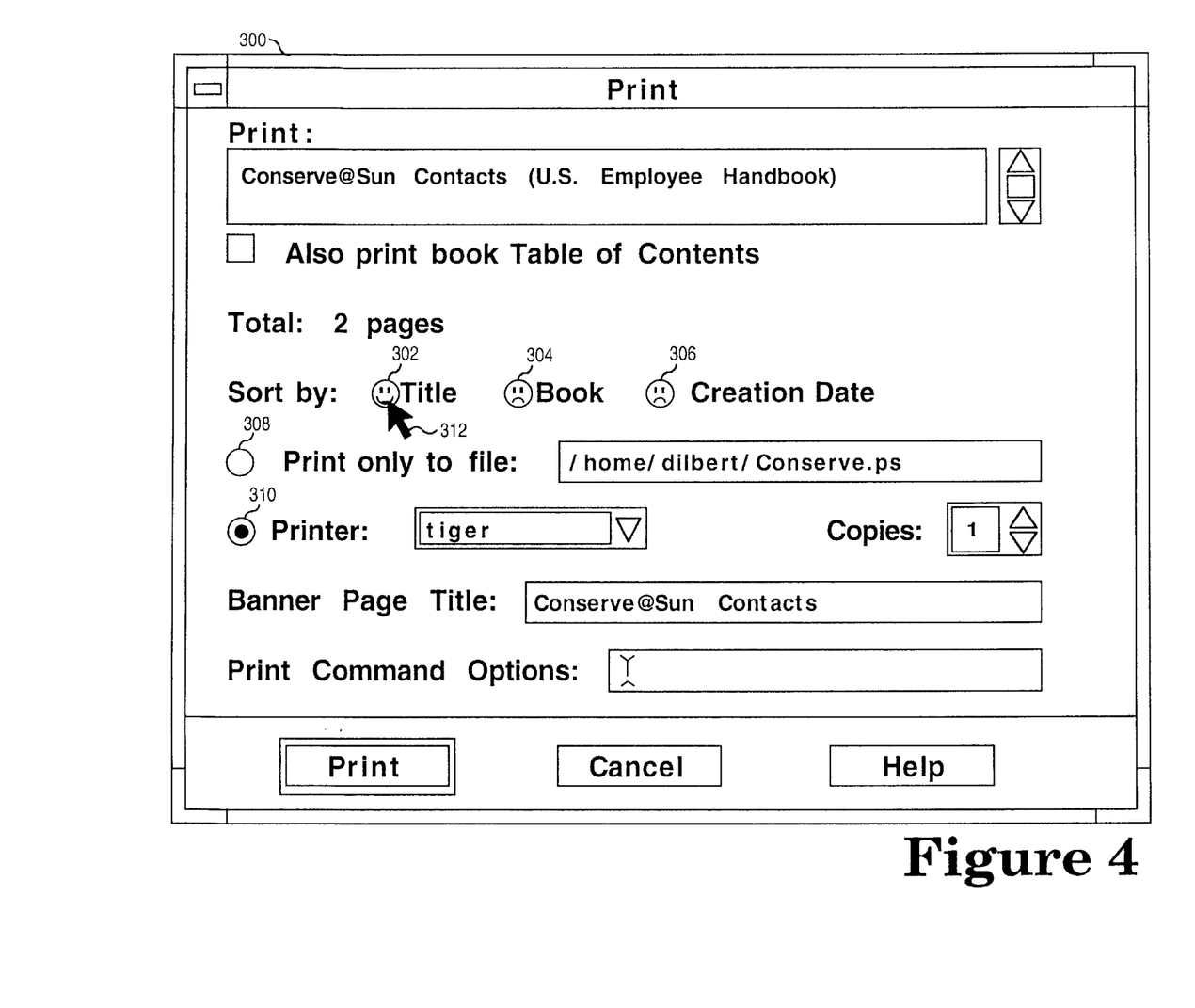
FIG. 4 illustrates a user interface that includes a set of radio buttons in excited and disappointed states according to an embodiment of the invention.

Referring to FIG. 4, it illustrates a user interface 300 configured with radio buttons 302, 304, 306, 308 and 310 according to an embodiment of the invention. In the illustrated example, radio buttons 302, 304 and 306 belong to a first radio button set, and radio buttons 308 and 310 belong to a second radio button set. While the user is not interacting with the radio buttons 302, 304, 306, 308 and 310, computer system 100 displays the radio buttons in the same manner as the prior art radio buttons shown in FIG. 1. Specifically, all radio buttons that correspond to options that are not currently selected are displayed in an unselected state, and all radio buttons that correspond to options that are currently selected are displayed in a selected state. In the illustrated example, radio button 308 is displayed in an unselected state and radio button 310 is displayed in a selected state.

During the option selection process, radio buttons 302, 304, 306, 308 and 310 do not behave according to convention. Rather, computer system 100 causes the visual appearance of all of the radio buttons in a radio button set to change when the user performs an object-selecting action that selects one of the radio buttons in the radio button set. In the illustrated example, the user has performed an object-selecting action that selects radio button 302. In response to the object-selecting action, computer 100 has changed the visual appearance of all of the radio buttons that belong to the radio button set of the selected radio button 302 (i.e. radio buttons 302, 304 and 306). The set of radio buttons to which a selected radio button belongs is referred to hereafter as the selected radio button set.

Because only the visual appearance of the radio buttons that belong to the selected radio button set change in response to the object-selecting action, the user is able to determine which options will be affected by the selection of the option associated with the selected radio button. In the illustrated example, the visual feedback informs the user that radio buttons 304 and 306 belong to the same radio button set as radio button 302, and that radio buttons 308 and 310 do not belong to the same radio button set as radio button 302. Consequently, the user would know, prior to actually selecting the option associated with radio button 302, that selection of the option associated with radio button 302 will select against the options associated with radio buttons 304 and 306, but will not have any effect on the selection state of the options associated with radio buttons 308 and 310.

According to one embodiment, the visual appearance of the radio buttons that belong to the selected radio button set do not all change in the same way. Rather, the selected radio button is displayed in an "excited state", while all of the other radio buttons in the selected radio button set are displayed in a "disappointed state". Both the excited state and the disappointed state are visually distinct from the selected and unselected states.

In the preferred embodiment, the image of a radio button in an excited state includes a face that reflects a positive emotion, while the image of a radio button in a disappointed state has a face that reflects a negative emotion. The face of the excited radio button may include, for example, a representation of eyes located above a representation of a smiling mouth. The face of a disappointed radio button may include, for example, a representation of eyes located above a representation of a straight or frowning mouth.

Figure 6:
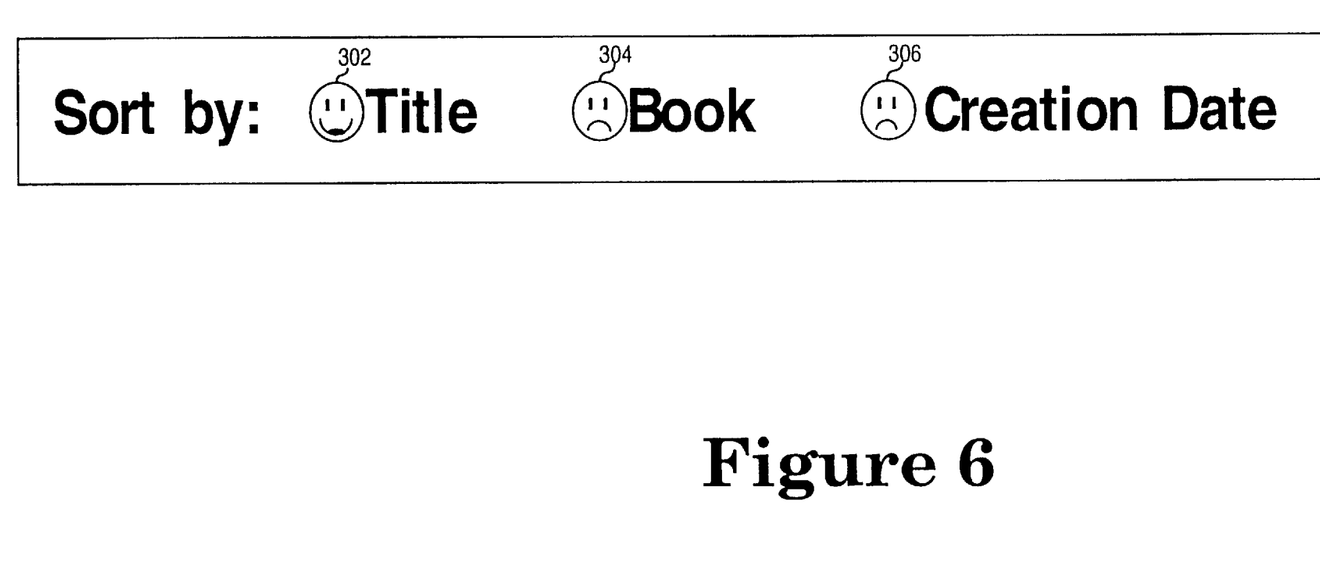
FIG. 6 illustrates in greater detail a set of radio buttons in excited and disappointed states.

In FIG. 4, button 302 is the radio button that has been selected by the user's object-selecting action. Therefore, radio button 302 is displayed in an excited state. Radio buttons 304 and 306 belong to the radio button set of the selected radio button, and are therefore displayed in a disappointed state. FIG. 6 illustrates buttons 302, 304 and 306 in excited and disappointed states with greater detail.

As mentioned above, the visual appearance of the radio buttons in the selected radio button set are changed in response to an object-selecting action. According to one embodiment, the visual appearance of the radio buttons in the selected radio button set is changed a second time in response to an option-selecting action. In the preferred embodiment, the radio buttons in the selected set are displayed once again in selected and unselected states. Specifically, the radio button that corresponds with the selected option is displayed in the selected state, and the remaining radio buttons in the selected radio button set are displayed in the unselected state.

For example, assume that pressing down on a mouse button while position indicator 312 is over a radio button is an object-selecting action, that releasing the mouse button while position indicator 312 is over a radio button is an option-selecting action, and that radio button 302 is initially selected. Under these assumptions, the initial display states of radio buttons 302, 304 and 306 will be selected, unselected and unselected, respectively. Consequently, buttons 302, 304 and 306 will have the same visual appearance as radio buttons 20, 22 and 24 of FIG. 1.

When the user positions the position indicator 312 over radio button 302 and presses the mouse button, radio button 302 becomes a selected radio button and the visual appearance of radio buttons 302, 304 and 306 changes to the states shown in FIG. 4. Specifically, radio button 302 is displayed in an excited state and radio buttons 304 and 306 are displayed in a disappointed state. If the user then releases the mouse button while the position indicator 312 is over radio button 302, the visual appearance of radio buttons 302, 304 and 306 respectively change back to selected, unselected and unselected display states.

Figure 5:
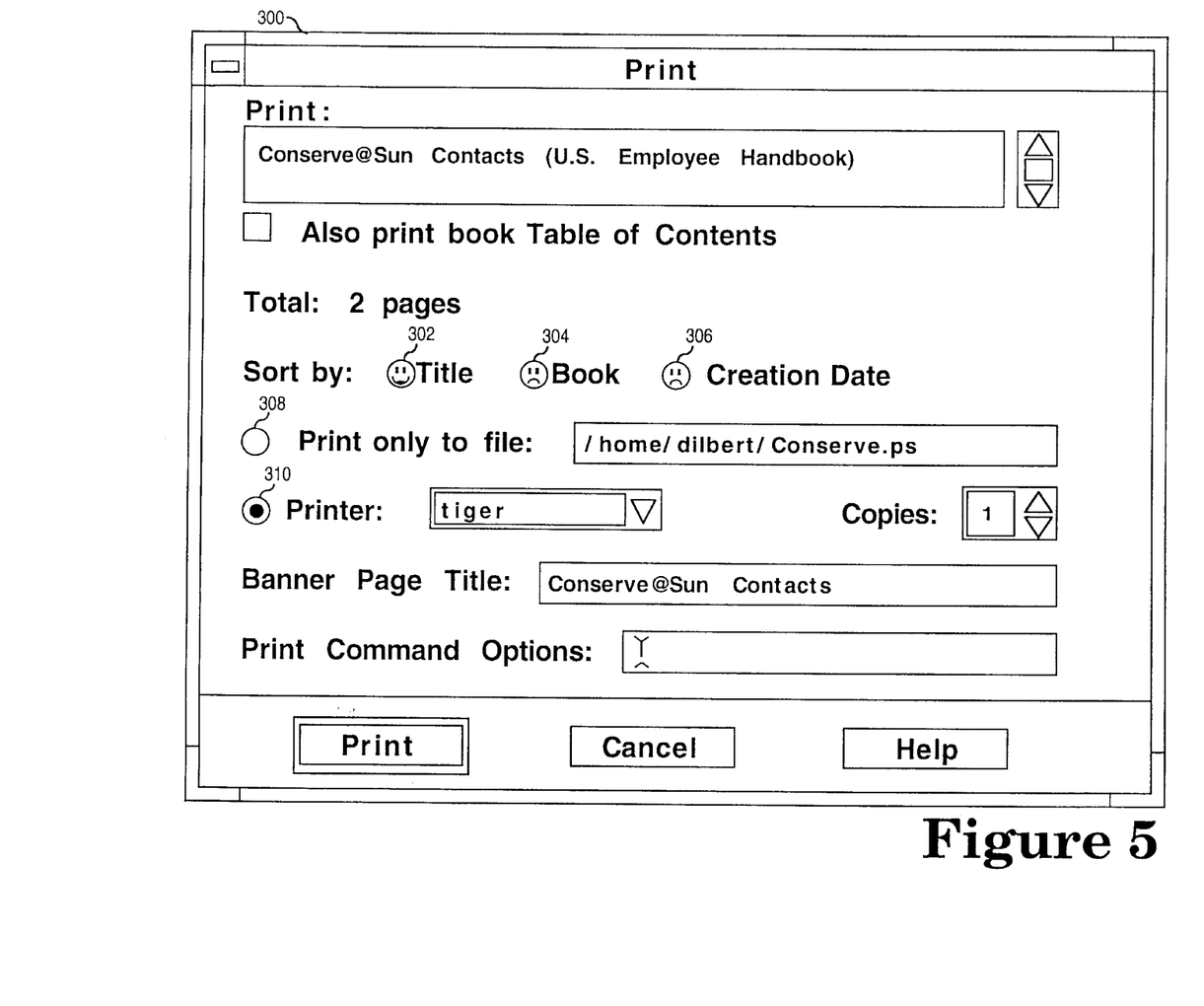
FIG. 5 illustrates the user interface of FIG. 4 without a position indicator.

According to an alternative embodiment of the invention, the radio buttons do not revert back to selected and unselected display states in response to an option-selecting action. Rather, the radio buttons remain in excited and disappointed states, as illustrated in FIG. 5. In this embodiment, a user is able to determine whether a selected option was expressly selected or selected by default simply by looking at the radio buttons associated with the options. The radio buttons representing options that have been expressly selected by the user will be displayed in an excited state, while the radio buttons associated with options that are merely selected by default will be displayed in the selected state. Similarly, the radio buttons associated with options that have been expressly selected against by the user will be displayed in a disappointed state, while the radio buttons that are unselected by default will be displayed in an unselected state.

One disadvantage to an embodiment that does not revert back to the selected and unselected display states is that when a user performs an object-selecting action, the radio buttons in the selected radio button set may not be the only buttons in excited and disappointed states. For example, if a user selects the option associated with radio button 302, and then performs an object-selecting action on radio button 308, radio buttons 304, 306 and 310 will all be displayed in a disappointed state. It is not apparent that radio buttons 304 and 306 are in the disappointed state in response to a previously-performed object-selecting action, while radio button 310 is in a disappointed state in response to the object-selecting action currently being performed on radio button 308.

The confusion that may result by leaving radio buttons in excited and disappointed states after an option selection process has been completed may be reduced by displaying excited and disappointed radio buttons that have some visual difference based on the radio button set to which they correspond. For example, the excited and disappointed states for one set of radio buttons may be implemented using yellow faces, while the excited and disappointed states of another set of radio buttons may be implemented using green faces. Alternative embodiments may use different types of visual distinctions. For example, one alternative embodiment may use different images for different sets of radio buttons, while another may use color or animation to provide the visually distinguishing feature.

For the purposes of explanation, the present invention has been described with reference to a system in which a radio button is selected by pressing a mouse button when a position indicator is over the radio button, and an option is selected by releasing the mouse button when the position indicator is over the selected radio button. However, this is simply one example of the types of user-events that may be used as object and option-selecting actions. Alternative embodiments may user other user actions to select objects and options. For example, to select a radio button, a user may press a particular key on a keyboard, or touch a touch sensitive screen at the point where a radio button is displayed. Similarly, to select the option associated with a selected radio button, a user may press a key on the keyboard or stop touching the touch sensitive screen. The present invention is not limited to any particular type or combination of object and option-selecting actions.

Under certain conditions, a single user-event may serve as both the object-selecting action and the option-selecting action. For example, in a system activated by speech input, both radio button 302 and the option "Title" may be selected in response to detecting that a user spoke the words "sort by title". According to one embodiment of the invention, the radio buttons are displayed in their excited and disappointed states in response to the single user-event, and continue to be displayed in the excited and disappointed states for some predetermined time interval, such as two seconds. After the predetermined interval, the radio buttons are again displayed in the selected and unselected states, where the radio button associated with the option selected by the voice command is the selected button and all of the other buttons in the radio button set are unselected.

Further, the present invention is applicable to all user interface objects that may be used to represent mutually exclusive options. For example, a menu may contain a set of menu items that correspond to a set of mutually-exclusive options. The option associated with a particular menu item is selected by a two-step process similar to that used to select the option associated with a radio button. Specifically, a user performs an object-selecting action to select a menu item associated with an option, then performs an option-selecting action to select the option associated with the selected menu item.

The present invention may be extended to menu items by causing computer system 100 to detect when a user performs an object-selecting action that selects a menu item and, to respond to detecting the object-selecting action by displaying the selected menu item in an excited state and the menu items that are associated with options that are mutually exclusive with respect to the option associated with the selected menu item in a disappointed state. In response to an option-selecting action, the computer system 100 displays the menu item associated with the selected option in a selected state, and the menu items that are associated with options that are mutually exclusive with respect to the selected option in an unselected state.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for allowing a user to select an option from a plurality of mutually exclusive options, the method comprising the computer-implemented steps of:

displaying a plurality of visual objects on a display of a computer system, each visual object of said plurality of visual objects corresponding to an option of said plurality of mutually exclusive options, each object of said plurality of visual objects having a visual appearance;

detecting an object-selecting action that selects one of said plurality of visual objects; and changing the visual appearance of each of said plurality of visual objects in response to detecting said object-selecting action.

2. The method of claim 1 further comprising the steps of:

detecting an option-selecting action that selects the option that corresponds to the visual object selected by said object-selecting action; and changing the visual appearance of each of said plurality of visual objects in response to detecting said option-selecting action.

3. The method of claim 2 wherein:

said step of displaying said plurality of visual objects includes the steps of displaying in a first state no more than one visual object of said plurality of visual objects; and displaying in a second state each of said plurality of visual objects that is not displayed in said first state;

said step of changing the visual appearance of each of said plurality of visual objects in response to said object-selecting action includes the steps of displaying in a third state the visual object selected by said object-selecting action; and displaying in a fourth state each visual object of said plurality of visual objects other than the visual object selected by said object-selecting action;

said step of changing the visual appearance of each of said plurality of visual objects in response to detecting said option-selecting action includes the steps of displaying in said first state the visual object selected by said object-selecting action; and displaying in said second state each of said plurality of visual objects other than the visual object selected by said object-selecting action.

4. The method of claim 3 wherein:

the step of displaying in a third state the visual object selected by said object-selecting action includes displaying a face having an expression that reflects a positive emotion; and the step of displaying in a fourth state each visual object of said plurality of visual objects other than the visual object selected by said object-selecting action includes displaying faces that have expressions that reflect a negative emotion.

5. The method of claim 2 wherein:

the step of detecting an object-selecting action includes detecting when a user pushes down on a button of a user input device; and the step of detecting an option-selecting action includes detecting when said user releases said button of said user input device.

6. The method of claim 1 wherein:

said step of displaying said plurality of visual objects includes the steps of displaying in a first state no more than one visual object of said plurality of visual objects; and displaying in a second state each of said plurality of visual objects that is not displayed in said first state;

said step of changing the visual appearance of each of said plurality of visual objects in response to said object-selecting action includes the steps of displaying in a third state the visual object selected by said object-selecting action; and displaying in a fourth state each visual object of said plurality of visual objects other than the visual object selected by said object-selecting action.

7. The method of claim 6 wherein:

the step of displaying in a third state the visual object selected by said object-selecting action includes displaying a face having an expression that reflects a positive emotion; and the step of displaying in a fourth state each visual object of said plurality of visual objects other than the visual object selected by said object-selecting action includes displaying faces having an expression that reflects a negative emotion.

8. The method of claim 1 wherein:

said plurality of visual objects are a particular type of graphical user interface object;

the method further comprises the step of displaying a second plurality of visual objects that correspond to a second set of mutually exclusive options;

said second plurality of visual objects are said particular type of graphical user interface object;

each object of said second plurality of visual objects has a visual appearance; and the visual appearance of said second plurality of visual objects is not changed in response detecting said object-selecting action.

9. The method of claim 8 further comprising the steps of:

detecting a second object-selecting action that selects one of said second plurality of visual objects;

changing the visual appearance of each of said second plurality of visual objects in response to detecting said second object-selecting action;

wherein the visual appearance of said plurality of visual objects is not changed in response to detecting said second object-selecting action.

10. The method of claim 8 wherein:

the step of displaying a plurality of visual objects is performed by displaying a first set of radio buttons; and the step of displaying a second plurality of visual objects is performed by displaying a second set of radio buttons.

11. A computer-readable medium having stored thereon a plurality of sequences of instructions, said plurality of sequences of instructions including sequences of instructions which, when executed by a processor, cause said processor to perform the steps of:

displaying a plurality of visual objects on a display of a computer system, each visual object of said plurality of visual objects corresponding to an option of a plurality of mutually exclusive options, each object of said plurality of visual objects having a visual appearance;

detecting an object-selecting action that selects one of said plurality of visual objects; and changing the visual appearance of each of said plurality of visual objects in response to detecting said object-selecting action.

12. The computer-readable medium of claim 11 wherein said plurality of sequences of instructions further include sequences of instructions which cause said processor to perform the steps of:

detecting an option-selecting action that selects the option that corresponds to the visual object selected by said object-selecting action; and changing the visual appearance of each of said plurality of visual objects in response to detecting said option-selecting action.

13. The computer-readable medium of claim 12 wherein:

said step of displaying said plurality of visual objects includes the steps of displaying in a first state no more than one visual object of said plurality of visual objects; and displaying in a second state each of said plurality of visual objects that is not displayed in said first state;

said step of changing the visual appearance of each of said plurality of visual objects in response to said object-selecting action includes the steps of displaying in a third state the visual object selected by said object-selecting action; and displaying in a fourth state each visual object of said plurality of visual objects other than the visual object selected by said object-selecting action;

said step of changing the visual appearance of each of said plurality of visual objects in response to detecting said option-selecting action includes the steps of displaying in said first state the visual object selected by said object-selecting action; and displaying in said second state each of said plurality of visual objects other than the visual object selected by said object-selecting action.

14. The computer-readable medium of claim 13 wherein:

the step of displaying in a third state the visual object selected by said object-selecting action includes displaying a face having an expression that reflects a positive emotion; and the step of displaying in a fourth state each visual object of said plurality of visual objects other than the visual object selected by said object-selecting action includes displaying faces that have expressions that reflect a negative emotion.

15. The computer-readable medium of claim 12 wherein:

the step of detecting an object-selecting action includes detecting when a user pushes down on a button of a user input device; and the step of detecting an option-selecting action includes detecting when said user releases said button of said user input device.

16. The computer-readable medium of claim 11 wherein:

said step of displaying said plurality of visual objects includes the steps of displaying in a first state no more than one visual object of said plurality of visual objects; and displaying in a second state each of said plurality of visual objects that is not displayed in said first state;

said step of changing the visual appearance of each of said plurality of visual objects in response to said object-selecting action includes the steps of displaying in a third state the visual object selected by said object-selecting action; and displaying in a fourth state each visual object of said plurality of visual objects other than the visual object selected by said object-selecting action.

17. The computer-readable medium of claim 16 wherein:

the step of displaying in a third state the visual object selected by said object-selecting action includes displaying a face having an expression that reflects a positive emotion; and the step of displaying in a fourth state each visual object of said plurality of visual objects other than the visual object selected by said object-selecting action includes displaying faces having an expression that reflects a negative emotion.

18. The computer-readable medium of claim 11 wherein:

said plurality of visual objects are a particular type of graphical user interface object;

the plurality of sequences of instructions further comprise a sequence of instructions which causes said processor to perform the step of displaying a second plurality of visual objects that correspond to a second set of mutually exclusive options;

said second plurality of visual objects are said particular type of graphical user interface object;

each object of said second plurality of visual objects has a visual appearance; and the visual appearance of said second plurality of visual objects is not changed in response detecting said object-selecting action.

19. The computer-readable medium of claim 18 wherein said plurality of sequences of instructions further include sequences of instructions which cause said processor to perform the steps of:

detecting a second object-selecting action that selects one of said second plurality of visual objects;

changing the visual appearance of each of said second plurality of visual objects in response to detecting said second object-selecting action;

wherein the visual appearance of said plurality of visual objects is not changed in response to detecting said second object-selecting action.

20. The computer-readable medium of claim 18 wherein:

the step of displaying a plurality of visual objects is performed by displaying a first set of radio buttons; and the step of displaying a second plurality of visual objects is performed by displaying a second set of radio buttons.

21. A computer system comprising:

a display device;

a processor coupled to said display device; and a storage unit coupled to said processor;

the storage unit having stored thereon a plurality of sequences of instructions, said plurality of sequences of instructions including sequences of instructions which, when executed by said processor, cause said processor to perform the steps of displaying a plurality of visual objects on said display device, each visual object of said plurality of visual objects corresponding to an option of a plurality of mutually exclusive options, each object of said plurality of visual objects having a visual appearance;

detecting an object-selecting action that selects one of said plurality of visual objects; and changing the visual appearance of each of said plurality of visual objects in response to detecting said object-selecting action.

22. The computer system of claim 21 wherein said plurality of sequences of instructions further include sequences of instructions which cause said processor to perform the steps of:

detecting an option-selecting action that selects the option that corresponds to the visual object selected by said object-selecting action; and changing the visual appearance of each of said plurality of visual objects in response to detecting said option-selecting action.

23. The computer system of claim 22 wherein:

said step of displaying said plurality of visual objects includes the steps of displaying in a first state no more than one visual object of said plurality of visual objects; and displaying in a second state each of said plurality of visual objects that is not displayed in said first state;

said step of changing the visual appearance of each of said plurality of visual objects in response to said object-selecting action includes the steps of displaying in a third state the visual object selected by said object-selecting action; and displaying in a fourth state each visual object of said plurality of visual objects other than the visual object selected by said object-selecting action;

said step of changing the visual appearance of each of said plurality of visual objects in response to detecting said option-selecting action includes the steps of displaying in said first state the visual object selected by said object-selecting action; and displaying in said second state each of said plurality of visual objects other than the visual object selected by said object-selecting action.

24. The computer system of claim 23 wherein:

the step of displaying in a third state the visual object selected by said object-selecting action includes displaying a face having an expression that reflects a positive emotion; and the step of displaying in a fourth state each visual object of said plurality of visual objects other than the visual object selected by said object-selecting action includes displaying faces that have expressions that reflect a negative emotion.

25. The computer system of claim 21 wherein:

said step of displaying said plurality of visual objects includes the steps of
- displaying in a first state no more than one visual object of said plurality of visual objects; and
- displaying in a second state each of said plurality of visual objects that is not displayed in said first state;

said step of changing the visual appearance of each of said plurality of visual objects in response to said object-selecting action includes the steps of displaying in a third state the visual object selected by said object-selecting action; and
- displaying in a fourth state each visual object of said plurality of visual objects other than the visual object selected by said object-selecting action.

26. The computer system of claim 25 wherein:

the step of displaying in a third state the visual object selected by said object-selecting action includes displaying a face having an expression that reflects a positive emotion; and the step of displaying in a fourth state each visual object of said plurality of visual objects other than the visual object selected by said object-selecting action includes displaying faces having an expression that reflects a negative emotion.

27. The computer system of claim 21 wherein:

said plurality of visual objects are a particular type of graphical user interface object;

the plurality of sequences of instructions further comprise a sequence of instructions which causes said processor to perform the step of displaying a second plurality of visual objects that correspond to a second set of mutually exclusive options;

said second plurality of visual objects are said particular type of graphical user interface object;

each object of said second plurality of visual objects has a visual appearance; and the visual appearance of said second plurality of visual objects is not changed in response detecting said object-selecting action.

28. The computer system of claim 27 wherein said plurality of sequences of instructions further include sequences of instructions which cause said processor to perform the steps of:
- detecting a second object-selecting action that selects one of said second plurality of visual objects;
- changing the visual appearance of each of said second plurality of visual objects in response to detecting said second object-selecting action;
- wherein the visual appearance of said plurality of visual objects is not changed in response to detecting said second object-selecting action.

29. The computer system of claim 27 wherein:

the step of displaying a plurality of visual objects is performed by displaying a first set of radio buttons; and the step of displaying a second plurality of visual objects is performed by displaying a second set of radio buttons.

30. The computer system of claim 21 wherein:

said step of displaying said plurality of visual objects includes the steps of
- displaying in a first state no more than one visual object of said plurality of visual objects; and
- displaying in a second state each of said plurality of visual objects that is not displayed in said first state;

said step of changing the visual appearance of each of said plurality of visual objects in response to said object-selecting action includes the steps of displaying in a third state the visual object selected by said object-selecting action; and
- displaying in a fourth state each visual object of said plurality of visual objects other than the visual object selected by said object-selecting action;

said plurality of sequences of instructions further includes sequences of instructions which cause said processor to perform the following steps a predetermined time interval after detecting said object-selecting action:
- displaying in said first state the visual object selected by said object-selecting action; and
- displaying in said second state each of said plurality of visual objects other than the visual object selected by said object-selecting action.

* * * * *

UNITED STATES PATENT AND TRADEMARK OFFICE
CERTIFICATE OF CORRECTION

PATENT NO. : 5,845,122
DATED : December 1, 1998
INVENTOR(S) : Nielsen et al.

It is certified that error appears in the above-identified patent and that said Letters Patent is hereby corrected as shown below:

Column 9,
Line 40, please delete "having an expression that reflects" and insert -- that have expressions that reflect --.

Column 11,
Line 1, please delete "that have expressions that reflect" and insert -- having an expression that reflects --.

Column 12,
Line 66, please delete "that have expressions that reflect" and insert -- having an expression that reflects --.

Column 13,
Line 19, please delete "having an expression that reflects" and insert -- that have expressions that reflect --.

Signed and Sealed this

Twenty-eighth Day of December, 2004

JON W. DUDAS
*Director of the United States Patent and Trademark Office*